May 30, 1950     H. G. ALLEN ET AL     2,509,714
TUBE FORMING MACHINE
Filed April 3, 1945     2 Sheets-Sheet 1
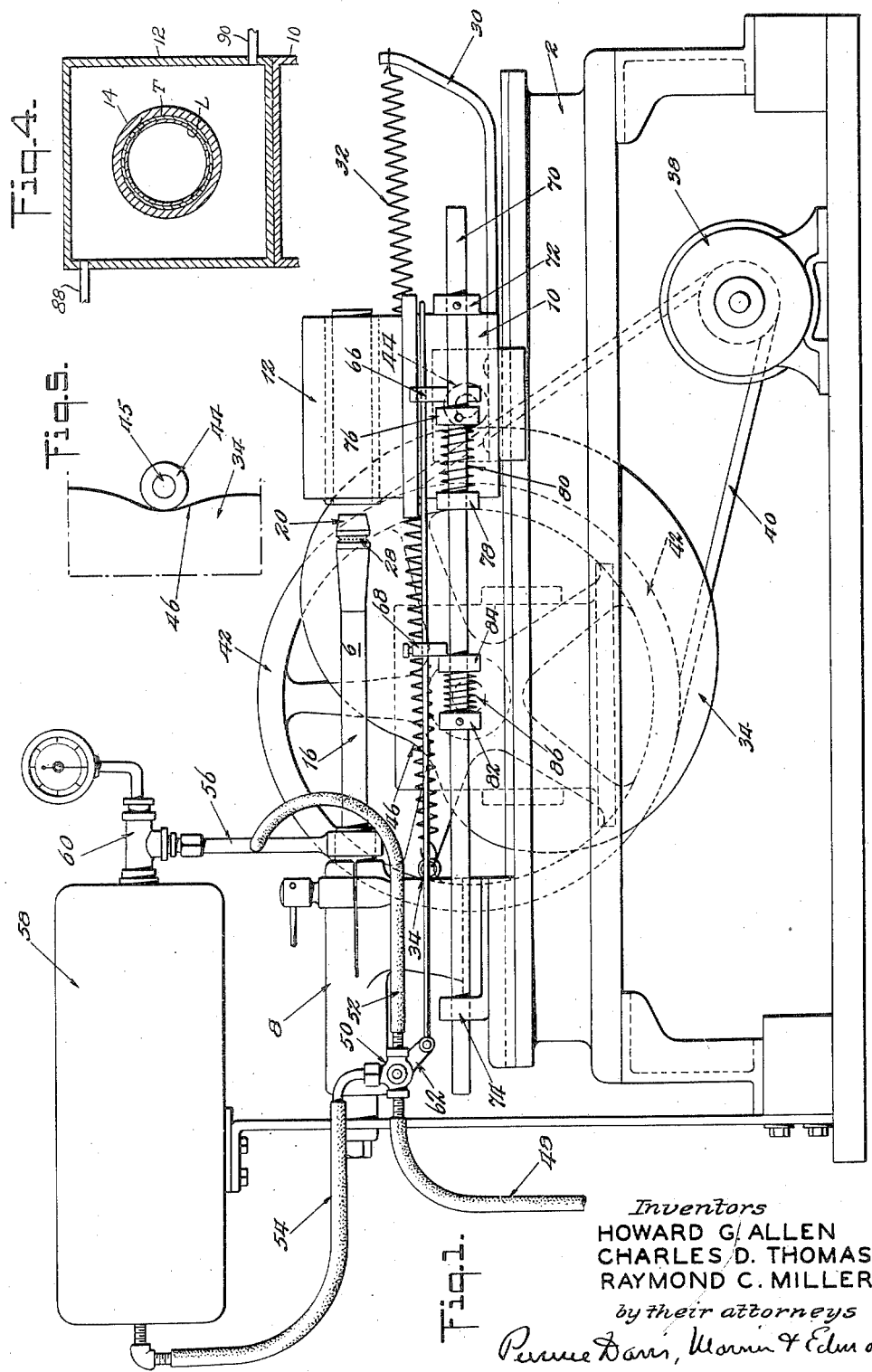
Inventors
HOWARD G. ALLEN
CHARLES D. THOMAS
RAYMOND C. MILLER
by their attorneys

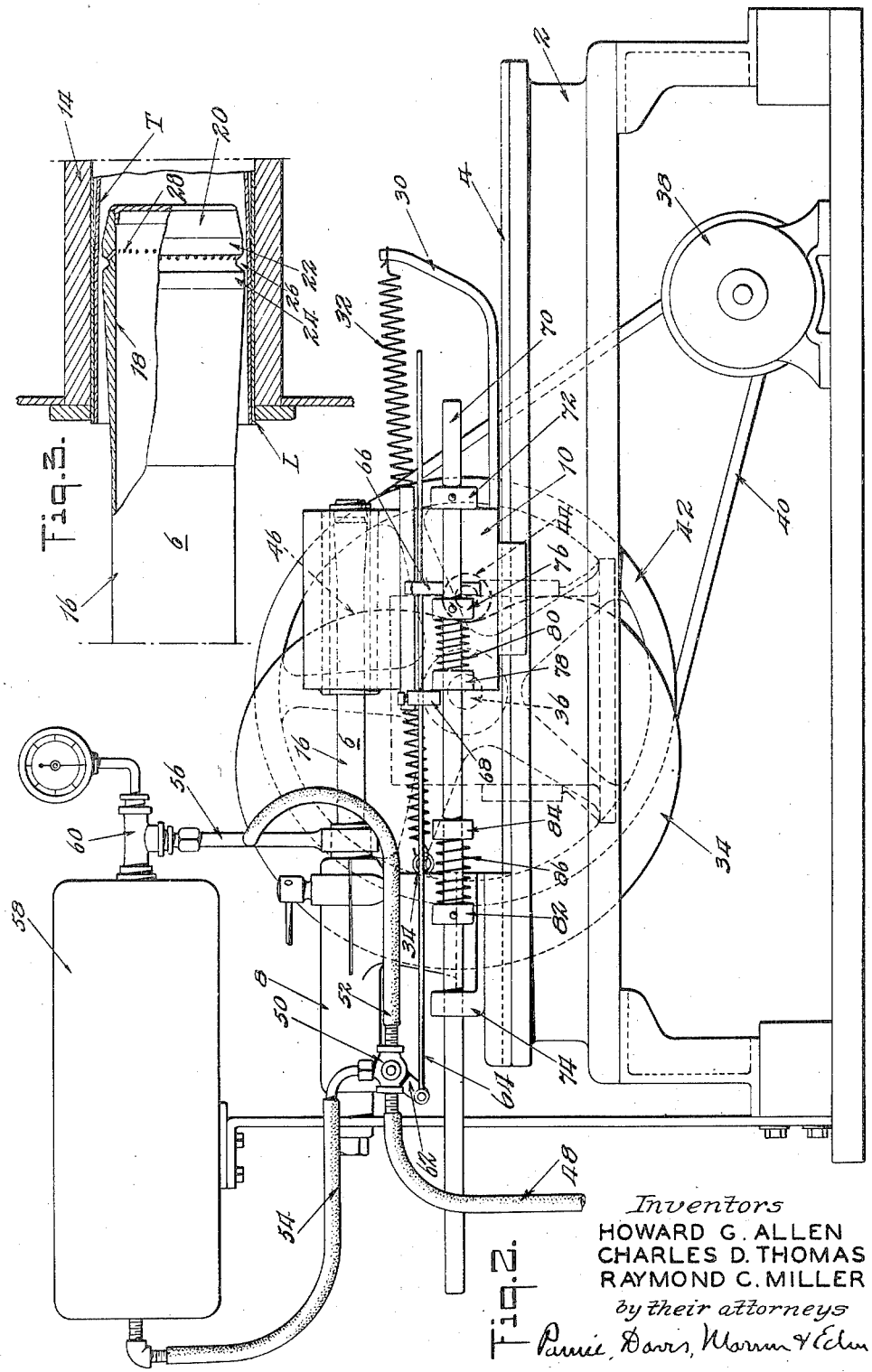

Patented May 30, 1950

2,509,714

UNITED STATES PATENT OFFICE 2,509,714

TUBE FORMING MACHINE

Howard G. Allen, Niagara Falls, and Charles D. Thomas and Raymond C. Miller, Hamburg, N. Y., assignors to American Type Founders, Inc., Elizabeth, N. J., a corporation of New Jersey Application April 3, 1945, Serial No. 586,344

6 Claims. (Cl. 93—77)

This invention relates to a method of and apparatus for manufacturing tubular bodies, and more particularly to the formation of tubes from sheet material, such as metal foil, paper, plastic films and the like.

Tubes of predetermined size are useful in the manufacture of various types of containers, for example, collapsible tubes for tooth paste, cosmetics, Vaseline, shaving creams and similar products. Heretofore, such tubular bodies have been formed of metal by an extrusion process. The availability of sheet material, such as plastics, metal foil, specific forms of paper and various other non-fibrous or fibrous sheets or films, suggests the manufacture of collapsible tubes and similar containers from such sheets or films.

While some of the sheet or film forming materials may be obtained in the form of tubes, a method of manufacturing tubular blanks from sheet material or stock of any desired length and diameter is highly desirable.

In the present invention we provide such a method. While the invention will be hereinafter described in connection with the manufacture of tubular blanks from metal foil coated with a thermoplastic, thermosetting or pressure sealable material, it will be obvious that the invention may be applied to the manufacture of tubular blanks from any suitable material so coated as to cause the layers of the blank to be heat sealed to each other.

In carrying out the invention we provide a die of a length and diameter substantially equal to the desired length and diameter of the tubular blank. The sheet from which the blank is to be formed is rolled of the desired number of layers and placed within the die. A mandrel is then caused to traverse the interior of the die from end to end and during this movement heated air is delivered from a portion of the mandrel into the interior of the rolled blank. The air is under the necessary pressure to force the sheet material outwardly against the wall of the die and at a proper temperature to cause the coating on the surface of the sheet material to firmly seal the layers to each other. The temperature of the air is further controlled to prevent burning or scorching of the material of which the blank is formed so as to prevent discoloration or injury of any printed matter appearing on the exterior of the tubular blank.

In the accompanying drawings we have shown one form of apparatus suitable for use in practicing the process and forming a part of the invention. In this showing, Fig. 1 is a front elevation of the apparatus with the parts in the position at rest;

Fig. 2 is a similar view showing the die at the end of its forward stroke over the mandrel;

Fig. 3 is a longitudinal, sectional view, on an enlarged scale, of the mandrel and die;

Fig. 4 is a transverse, sectional view of the die showing cooling means for the die; and Fig. 5 is a diagrammatic view of the cam by means of which movement is imparted to the die.

Referring to the drawings, the reference numeral 2 designates generally the frame of a machine having a bed 4 on which the die reciprocates. A mandrel 6 is mounted in a bracket or headstock 8 at one end of the machine and a carriage 10 is mounted to reciprocate on the bed. The carriage supports and carries a box 12 in which the die is arranged. The die is in the form of a tube 14 having an inside diameter substantially equal to the outer diameter of the tubular blanks to be formed. The die projects through the end walls of the box, as shown in Fig. 3 of the drawings, and the interior of the box surrounding the die is filled with water or other cooling fluid.

The mandrel, which is hollow and closed at both ends, is arranged in axial alignment with the die and is preferably formed with a relatively thin intermediate section 16. At the far end, the wall of the mandrel is thicker than the intermediate portion, as indicated at 18. The inner end or the end of the mandrel which first enters the die is tapered as at 20 to facilitate entrance into the die and adjacent the end is provided with a pair of spaced lands 22 and 24. These lands are separated from each other by a groove 26. A plurality of small openings or passages 28 extend into the groove and are arranged at an angle extending from a point nearer the end of the mandrel than the outlet openings.

The die is reciprocated over the mandrel by any suitable drive means. As shown, an arm 30 is secured to the carriage and a coil spring 32 is connected to this arm and to an eye 34 mounted on the stock 8. This spring normally tends to move the carriage to the position shown in Fig. 2 of the drawings. The carriage is retained in the position shown in Fig. 1 of the drawings by means of a cam 34. This cam is mounted on a shaft 36 driven in any suitable manner. For purpose of illustration we have shown a motor 38 having a belt 40 passing over a pulley on the motor shaft and over a pulley 42 on the shaft 36. A roller 44 is mounted on an arm 45 carried by the carriage and this roller is held against the cam by the spring 32. With the parts in the position shown in Fig. 1 of the drawings, when the motor is started, rotation of the cam permits the roller to move from the concentric portion toward the low portion 46 of the cam and the spring 32, which is under tension, moves the die over the mandrel to the position shown in Fig. 2 of the drawings. Further rotation of the cam causes it to move the roller 44 to the right in the drawings, returning the die to the position shown in Fig. 1.

During the movement of the die and carriage, air is delivered to the interior of the mandrel and directed through the openings 28 to cause a roll of foil in the die to be expanded against the wall of the die to form the tubular blank. Air under pressure is delivered from any suitable source through a hose or conduit 48 to valve 50. Valve 50 may be arranged in either of two positions to deliver air to conduit 52 or conduit 54. Air delivered to conduit 52 is conveyed to a pipe 56 which is connected to the end of the mandrel. Conduit 54 is connected to a tank or container containing suitable heating means, such as an electric heating coil, and air under pressure from pipe 54 passing through heated tank 58 is delivered to the pipe 56 through the T-joint 60.

While the details of the valve mechanism have not been described, as various valve structures are available for this purpose, we provide mechanism for operating the valve 50 to deliver cold air to the mandrel during the forward stroke of the carriage and die and heated air during the return stroke. Valve 50 is provided with a handle 62 connected to the rod 64 supported in a bracket 66 on the frame of the machine. A finger or lug 68 is secured to this rod and projects therefrom. A second rod 70 is secured to the carriage as at 72 and moves therewith. The other end of the rod passes through an opening in bracket 74 mounted on the frame of the machine. This rod is provided with two pairs of collars. One pair of collars is adjacent one end of the rod to actuate the valve at the end of the forward stroke and consists of a collar 76 secured to the rod, and a second collar 78 free to move on the rod, the two collars being held in spaced relation by a spring 80. Similarly, adjacent the other end of the rod there is provided a fixed collar 82 and a movable collar 84 spaced by a spring 86.

In operation, the material from which the tubular blank is to be made is cut in the desired lengths and rolled to form a scroll or roll of the desired number of layers. In the practice of the process we have prepared tubular blanks for use in the manufacture of collapsible tubes from aluminum foil coated with a heat-sealing material and we have used sheets of a size to form two layers as indicated at T in Fig. 3 of the drawings. The rolled sheet of foil is placed in the die with the ends projected approximately $\frac{1}{32}$" at each end of the die as indicated at L in Fig. 3 of the drawings. The motor is then started and movement of the cam 34 permits the spring 32 to move the carriage and die over the mandrel from the position shown in Fig. 1 of the drawings to the position shown in Fig. 2 of the drawings. In the position of the parts shown in Fig. 1, the valve 50 is held in position to deliver cold air to pipe 52, thence to pipe 56 and thence through the mandrel. The valve is held in this position by collar 84 on rod 70 which holds the finger 68 in the position shown in Fig. 1. When movement of the carriage causes rod 70 to shift toward the left, collar 84 moves away from finger 68. However, the valve remains in its position during this stroke of the carriage and unheated air flows through pipe 52 to the mandrel as the carriage moves the die over the mandrel. The air issuing from the jets 28 forces the sheet material T outwardly against the wall of the die 14.

At the end of the forward stroke, the low point 46 of the cam has come into engagement with the roller 44 and further rotation of shaft 36 causes the cam to move the carriage and die from the position shown in Fig. 2 of the drawings to the position shown in Fig. 1 of the drawings. During this return movement, heated air is admitted to the interior of the die from the openings in the mandrel. As the carriage completes its movement from the position shown in Fig. 1 to the position shown in Fig 2, collar 78 engages finger 68 causing the rod 64 to be shifted toward the left. This moves the valve to the position shown in Fig. 2 cutting off the supply of air to pipe 52 and supplying air to pipe 54. Air flowing through pipe 54 passes through the heated tank 58, thence to the pipe 56 through the T-joint 60 to deliver heated air to the mandrel during the return movement of the carriage from the position shown in Fig. 2 to the position shown in Fig. 1. At the end of this stroke the power of the motor is shut off or shaft 36 is disconnected from the motor to bring the die to a position of rest in the position shown in Fig. 1 of the drawings. The formed tubular blank is then taken from the die and another rolled sheet is then inserted for the formation of another tubular blank.

Provision of the two lands 22 and 24 provides a restricted zone of application of pressure or heat and pressure to the blank and produces more efficient results than would otherwise be obtained. The clearance between the mandrel and the die is small so that the action of the air is restricted to the area immediately adjacent the groove 26. The jets 28 are preferably arranged at the angle shown so that the air is directed at an angle to cause a forward rake on the work as the die moves along. The introduction of cooled or unheated air during the forward stroke of the die causes a cooling of the die and mandrel from the preceding cycle and also causes the foil to attempt to assume its final position. The heated air delivered on the return stroke produces the final smoothing of the foil to the size of the die and seals the layers to each other. The temperatures and pressures employed may of course be varied. In forming a tubular blank of two convolutions of aluminum foil of a thickness of .002" in a die having a cylindrical bore of 1.013" we have employed temperatures of 500 to 700° F. without discoloration or injury to printed matter on the exterior of the formed blank. The pressures may vary from 60 to 100 pounds per square inch.

While we have illustrated and described the use of unheated air, in some instances the unheated air is not necessary and results may be obtained by using heated air alone. It is of course necessary to heat the air during a portion of the cycle when thermoplastic or thermosetting coatings are employed to seal the layers of the foil or other sheet material to each other. It is furthermore desirable that the exterior of the die be cooled as otherwise the effect of succeeding operations will be cumulative and the mandrel and die will become heated to a point where discoloration or injury of the foil will result.

Cooling of the die by water or other cooling fluid in the box 12 is essential as otherwise heat from the previous cycles would create a rise in temperature in the die and result in discoloration of the exterior of the tubular blank which is forced into contact with the wall of the die. Cooling further facilitates removal of the formed blanks as the tubes contract when the delivery of heated air is disconnected and this permits the removal of them from the die. The cooling may be effected by passing water or other cooling fluid through the box 12 in the space surrounding the die as shown in Fig. 4. The box may be provided with a suitable inlet 88 and an outlet 90 for the cooling fluid. The use of a plurality of small, substantially radial, jets and the restriction of the application of fluid pressure to a relatively small zone during any period of operation results in the production of a tubular blank of uniform smoothness and uniform size throughout. In prior efforts to expand a roll of material in a hollow die, we found that one of the difficulties was a tendency of the air or other fluid to get between the layers of the material and prevent proper sealing of the layers to each other. This is overcome when the air pressure is restricted to a small zone of application.

For purposes of illustration we have shown the die movable and the mandrel stationary. It will be apparent that relative movement of these two members is necessary and could be accomplished by employing a stationary die and a mandrel movable into and out of the die. We have also illustrated a blank of circular cross section. The tube, of course, could be other than cylindrical in form by employing a die having a bore of the desired shape. The corners of the die and the blank must be axially parallel to permit withdrawal of the finished blank. In constructing blanks of shapes not having parallel corners it would be necessary to provide a separable die for removal of the finished blank from the die.

The form of the invention herein shown is for the purpose of illustration only and the invention is not deemed to be limited to the illustrated details.

We claim:

1. The method of forming tubular blanks from sheet material coated with a material capable of sealing by heat which comprises placing a roll of such material of two or more layers in an open ended die, delivering unheated air under pressure to restrictive areas of the interior of the roll progressively from end to end of the die and then delivering heated air to restrictive areas of the interior of the roll progressively from end to end of the die to cause the material to expand against the wall of the die and to cause the layers to be sealed to each other.

2. Apparatus for manufacturing tubular blanks comprising an open ended cylindrical die, a mandrel in axial alignment therewith, means for reciprocating one of the devices with respect to the other to cause the mandrel to traverse the interior of the die, and means for delivering air under pressure from the mandrel into the interior of the die.

3. Apparatus for manufacturing tubular blanks comprising an open ended cylindrical die, a mandrel in axial alignment therewith, means for reciprocating one of the devices with respect to the other to cause the mandrel to traverse the interior of the die, means for delivering air under pressure from the mandrel into the interior of the die, and means for cooling the die.

4. Apparatus for manufacturing tubular blanks comprising an open ended cylindrical die, a mandrel in axial alignment therewith, means for reciprocating one of the devices with respect to the other to cause the mandrel to traverse the interior of the die, means for delivering air under pressure from the mandrel into the interior of the die, and means for restricting the flow of air from the mandrel to a limited area of the die.

5. Apparatus for manufacturing tubular blanks comprising an open ended cylindrical die, a cooling jacket surrounding the die, a mandrel arranged in axial alignment with the die, means for causing movement of the mandrel through the die from end to end thereof, means for delivering fluid under pressure to the interior of the mandrel, the mandrel being provided with a plurality of openings extending radially and arranged in a plane normal to the axis of the mandrel.

6. Apparatus for manufacturing tubular blanks comprising an open ended cylindrical die, a cooling jacket surrounding the die, a mandrel arranged in axial alignment with the die, means for causing movement of the mandrel through the die from end to end thereof, means for delivering fluid under pressure to the interior of the mandrel, the mandrel being provided with a plurality of openings extending radially and arranged in a plane normal to the axis of the mandrel, and means for confining the air delivered from said openings to a restricted area of the interior of the die.

HOWARD G. ALLEN.
CHARLES D. THOMAS.
RAYMOND C. MILLER.

REFERENCES CITED

The following references are of record in the file of this patent:

UNITED STATES PATENTS

| Number | Name | Date |
|---|---|---|
| 642,537 | Thoma | Jan. 30, 1900 |
| 1,106,005 | Shevlin | Aug. 4, 1914 |
| 1,638,386 | Yancey | Aug. 9, 1927 |
| 1,802,229 | Yancey | Apr. 21, 1931 |